US008756226B2

(12) United States Patent
Hamano et al.

(10) Patent No.: US 8,756,226 B2
(45) Date of Patent: Jun. 17, 2014

(54) INFORMATION PROCESSING APPARATUS, INFORMATION PROCESSING METHOD, AND INFORMATION PROCESSING PROGRAM

(75) Inventors: Tomoaki Hamano, Shinagawa-ku (JP); Masatoshi Kumakawa, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/124,505

(22) PCT Filed: May 18, 2010

(86) PCT No.: PCT/JP2010/058386
§ 371 (c)(1),
(2), (4) Date: Apr. 15, 2011

(87) PCT Pub. No.: WO2010/137497
PCT Pub. Date: Dec. 2, 2010

(65) Prior Publication Data
US 2011/0208729 A1    Aug. 25, 2011

(30) Foreign Application Priority Data

May 25, 2009    (JP) ................................. 2009-125767

(51) Int. Cl.
*G06F 17/30* (2006.01)
(52) U.S. Cl.
USPC ......................................................... 707/732
(58) Field of Classification Search
USPC ......................................................... 707/732
See application file for complete search history.

(56) References Cited

U.S. PATENT DOCUMENTS 6,314,420 B1 * 11/2001 Lang et al. ............................. 1/1
6,327,590 B1 * 12/2001 Chidlovskii et al. .......... 707/734
(Continued)

FOREIGN PATENT DOCUMENTS

JP      2006-195942 A      7/2006
JP      2006-309381 A      11/2006
(Continued)

OTHER PUBLICATIONS

'G. Plan, Tsuhan Shohin Kensaku ya Point Kakutoku, Dokuji Tool Bar de Yoi ni', Nikkei Marketing Journal, Nikkei Inc., Mar. 6, 2009, p. 7.
(Continued)

*Primary Examiner* — Ajay Bhatia
*Assistant Examiner* — Kurt Mueller
(74) *Attorney, Agent, or Firm* — Sughrue Mion, PLLC

(57) ABSTRACT

The invention provides an information processing apparatus, an information processing method, and an information processing program that can improve convenience of a user and facilitate participation of a user, with respect to an existing group having members (users).
In the invention, a search request including a search keyword 44 input to an entry field 31 for search in a toolbar 30 displayed on a screen of a terminal 21, toolbar identification information 42 associated with and allocated to each of the groups, and member identification information 43 identifying members are received from the terminal (S6), the members are identified on the basis of the member identification information, a member search request of each of members is counted by accumulating a history of the search request for each of members, and a group search request as the group is counted by counting the member search request on the basis of the toolbar identification information (S10), member total points 33 that are distributable to the members are updated on the basis of the counted group search request (S33 and S34), and information of the member total points is transmitted to the terminal (S15).

16 Claims, 13 Drawing Sheets

(56) References Cited

U.S. PATENT DOCUMENTS

| | | |
|---|---|---|
| 6,732,088 B1 * | 5/2004 | Glance .................................. 1/1 |
| 2005/0131866 A1 | 6/2005 | Badros et al. |
| 2006/0242133 A1 * | 10/2006 | Denny et al. ....................... 707/3 |
| 2006/0265283 A1 * | 11/2006 | Gorodyansky ................... 705/14 |
| 2007/0226183 A1 * | 9/2007 | Hart et al. ......................... 707/3 |
| 2008/0215553 A1 * | 9/2008 | Badros et al. ..................... 707/3 |
| 2008/0222108 A1 * | 9/2008 | Prahlad et al. .................... 707/3 |
| 2008/0228745 A1 | 9/2008 | Markus et al. |
| 2010/0153413 A1 * | 6/2010 | Mok et al. ..................... 707/758 |

FOREIGN PATENT DOCUMENTS

| | | |
|---|---|---|
| JP | 2008-513887 A | 5/2008 |
| WO | 2006/031864 A2 | 3/2006 |

OTHER PUBLICATIONS

Yutaka Katano, Digital Shiki Money Benricho, Nikkei Zero-One, Sep. 1, 2004, p. 61, vol. 99.

'Rakuten Ichiba' no Shohin Kensaku ga Kantan ni Dekiru 'Rakuten Tool Bar' Teikyo Kaishi, Internet<URL:http://corp.rakuten.co.jp/newsrelease/2008/0902.htm.> Sep. 2, 2008, [online], [Retrieved on Jun. 2, 2010].

Japanese Office Action No. 2008-334198 dated Aug. 17, 2010.

Japanese Office Action No. 2008-334215 dated Aug. 17, 2010.

Tetsu Sawamura, The necessaries of a comfortable net cruise such as Google/Yahoo!—The tool bar large set of IE, PCfan, vol. 11, No. 16, Mainichi Communications, Inc., Sep. 15, 2004, vol. 11, pp. 77-79.

* cited by examiner

INFORMATION PROCESSING APPARATUS, INFORMATION PROCESSING METHOD, AND INFORMATION PROCESSING PROGRAM

CROSS REFERENCE TO RELATED APPLICATION

This application is a National Stage of International Application No. PCT/JP2010/058386 filed May 18, 2010, claiming priority based on Japanese Patent Application No. 2009-125767, filed May 25, 2009, the contents of all of which are incorporated herein by reference in their entirety.

TECHNICAL FIELD

The invention relates to an information processing apparatus that receives a search request including a search keyword from a terminal and executes information processing, an information processing method, and an information processing program.

BACKGROUND ART

In recent years, since the Internet spreads in each home, an environment where each user reads information, purchases a product, participates in a group on a specific page to exchange information, and grasps the behavior of other users on the Internet is constructed. For this reason, various types of advertisements such as a banner advertisement, a listing advertisement, and an affiliate advertisement using the Internet are developed.

Under this situation, a social participation of the user who uses the Internet advertisement is made. For example, Patent Document 1 discloses an international welfare support method using an affiliate advertisement in which an organization is constructed by server managers/operators, plural nonprofit groups, personal supporters who support the nonprofit groups, advertisers, providers, advertisement agents, financial institutions, and support groups, in which terminals are networked through the Internet such that host computers of the server managers/operators manage accession, withdrawal, combination, and the like with respect to the organization, and manage counting, distribution, and the like of support money, contributions, proceeds, and the like.

CITATION LIST

Patent Document

Patent Document 1: Japanese Patent Application Laid-Open Publication No. 2006-195942

DISCLOSURE OF INVENTION

Problems to be Solved by the Invention

However, in the related art, the user needs to establish a web page to perform the affiliate advertisement, use of a user who has no motivation to establish the web page is difficult, and it is difficult to gather a lot of participants. In order to allow people to repetitively read the web page, contents of the web page need to be continuously updated. For this reason, there is a great burden on the user, and the use is difficult.

The invention has been made in view of the above circumferences and it is an object of the invention to provide an information processing apparatus, an information processing method, and an information processing program that can improve convenience of a user and facilitate participation of a user, with respect to an existing group having members (users).

Solutions to the Problems

In order to achieve the above described problems, an invention according to a first aspect is characterized in that in an information processing apparatus for receiving a search request including a search keyword input to an entry field for search in a toolbar displayed on a screen of a terminal from the terminal and executing information processing, the information processing apparatus includes: group information storage means for storing information received from each of groups and associated with each of the groups; toolbar information storage means for storing toolbar identification information associated with and allocated to each of the groups; member information storage means for storing member identification information identifying members belonging to each of the groups and s associated with each of the groups; receiving means for receiving the toolbar identification information, the member identification information, and the search request from the terminal; evaluating means for identifying the members on the basis of the member identification information with reference to the member information storage means, and counting a member search request of each of members by accumulating a history of the search request for each of members; counting result storage means for storing a counting result of the evaluating means; total point calculating means for calculating member total points distributable to the members; and transmitting means for transmitting information of the member total points to the terminal, wherein the evaluating means refers to the toolbar storage means, counts the member search request on the basis of the toolbar identification information, and counts a group search request as each of the groups, and the total point calculating means updates the member total points on the basis of the counted group search request.

An invention according to a second aspect is characterized in that in the information processing apparatus according to the first aspect, the evaluating means counts member points for each of members distributed to each of members from the member total points, on the basis of the member search request.

An invention according to a third aspect is characterized in that in the information processing apparatus according to the first or second aspect, the total point calculating means sets initial member total points, on the basis of the group search request counted during a past constant period.

An invention according to a fourth aspect is characterized in that in the information processing apparatus according to any one of the first to third aspects, the evaluating means counts the number of group search for each of the groups, on the basis of the group search request.

An invention according to a fifth aspect is characterized in that in the information processing apparatus according to the fourth aspect, the total point calculating means updates the member total points, in the case where the number of group search exceeds the number of search of a threshold value.

An invention according to a sixth aspect is characterized in that in the information processing apparatus according to the fifth aspect, the number of search of the threshold value is calculated on the basis of the number of group search counted during a past constant period.

An invention according to a seventh aspect is characterized in that in the information processing apparatus according to any one of the first to sixth aspects, the information processing apparatus further includes: data generating means that generates data having a format to display information of the member total points on the toolbar.

An invention according to an eighth aspect is characterized in that in the information processing apparatus according to any one of the first to seventh aspects, the data generating means generates data having the format to display a search result with respect to the search request and information of the member total points.

An invention according to a ninth aspect is characterized in that in the information processing apparatus according to any one of the first to eighth aspects, the information processing apparatus further includes toolbar providing means for allocating toolbar identification information to each of the groups and issuing the toolbar.

An invention according to a tenth aspect is characterized in that in an information processing method for receiving a search request including a search keyword input to an entry field for search in a toolbar displayed on a screen of a terminal from the terminal and executing information processing, the information processing method includes: a group information storage step for storing information received from each of groups and associated with each of the group; a toolbar information storage step for storing toolbar identification information associated with and allocated to each of the groups; a member information storage step for storing member identification information to identify members belonging to each of the groups and associated with each of the groups; a receiving step for receiving the toolbar identification information, the member identification information, and the search request from the terminal; a evaluating step for identifying the members on the basis of the member identification information with reference to the member information storage means, and counting a member search request of each of members by accumulating a history of the search request for each of members; a counting result storage step for storing a counting result of the evaluating means; a total point calculating step for calculating member total points distributable to the members; and a transmitting step for transmitting information of the member total points to the terminal, wherein in the evaluating step, the toolbar storage means is referred to, and a group search request as each of the groups is counted by counting the member search request on the basis of the toolbar identification information, and in the total point calculating step, the member total points are updated on the basis of the counted group search request.

An invention according to an eleventh aspect is characterized in that in an information processing program for causing a computer to receive a search request including a search keyword input to an entry field for search in a toolbar displayed on a screen of a terminal from the terminal and execute information processing, the information processing program causes the computer to function as: group information storage means for storing information received from each of groups and associated with each of the groups; toolbar information storage means for storing toolbar identification information associated with and allocated to each of the groups; member information storage means for storing member identification information identifying members belonging to each of the groups and associated with each of the groups; receiving means for receiving the toolbar identification information, the member identification information, and the search request from the terminal; evaluating means for identifying the members on the basis of the member identification information with reference to the member information storage means, and counting a member search request of each of members by accumulating a history of the search request for each of members; counting result storage means for storing a counting result of the evaluating means; total point calculating means for calculating member total points distributable to the members; and transmitting means for transmitting information of the member total points to the terminal, wherein the evaluating means refers to the toolbar storage means, and counts a group search request as each of the groups by counting the member search request on the basis of the toolbar identification information, and the total point calculating means updates the member total points on the basis of the counted group search request.

An invention according to a twelfth aspect is characterized in that in a recording medium, the information processing program according to the eleventh aspect is recorded to be readable by the computer.

Effects of the Invention

According to the invention, a search request including a search keyword input to an entry field for search in a toolbar displayed on a screen of a terminal, toolbar identification information associated with and allocated to each of the groups, and member identification information identifying members are received from the terminal, the members are identified on the basis of the member identification information, a member search request for each of members is counted by accumulating a history of the search request for each of members, and a group search request as each of the groups is counted by counting the member search request on the basis of the toolbar identification information, member total points that are distributable to the members are updated on the basis of the counted group search request, and information of the member total points is transmitted to the terminal. As a result, even when the member as a user uses the toolbar installed in the browser and the like once to perform the search, the member total points, which reflect the group search request obtained by counting search requests from the members in individual terminals, can be shown to the members. Therefore, this causes the member to use with ease and prompts participation of the member as the group activity.

BEST MODES FOR CARRYING OUT THE INVENTION

Hereinafter, embodiments of the invention will described with reference to the drawings.

First Embodiment

First, a schematic configuration and a function of an information processing server system in accordance with a first embodiment of the invention will be described on the basis of the drawings.

Figure 1:
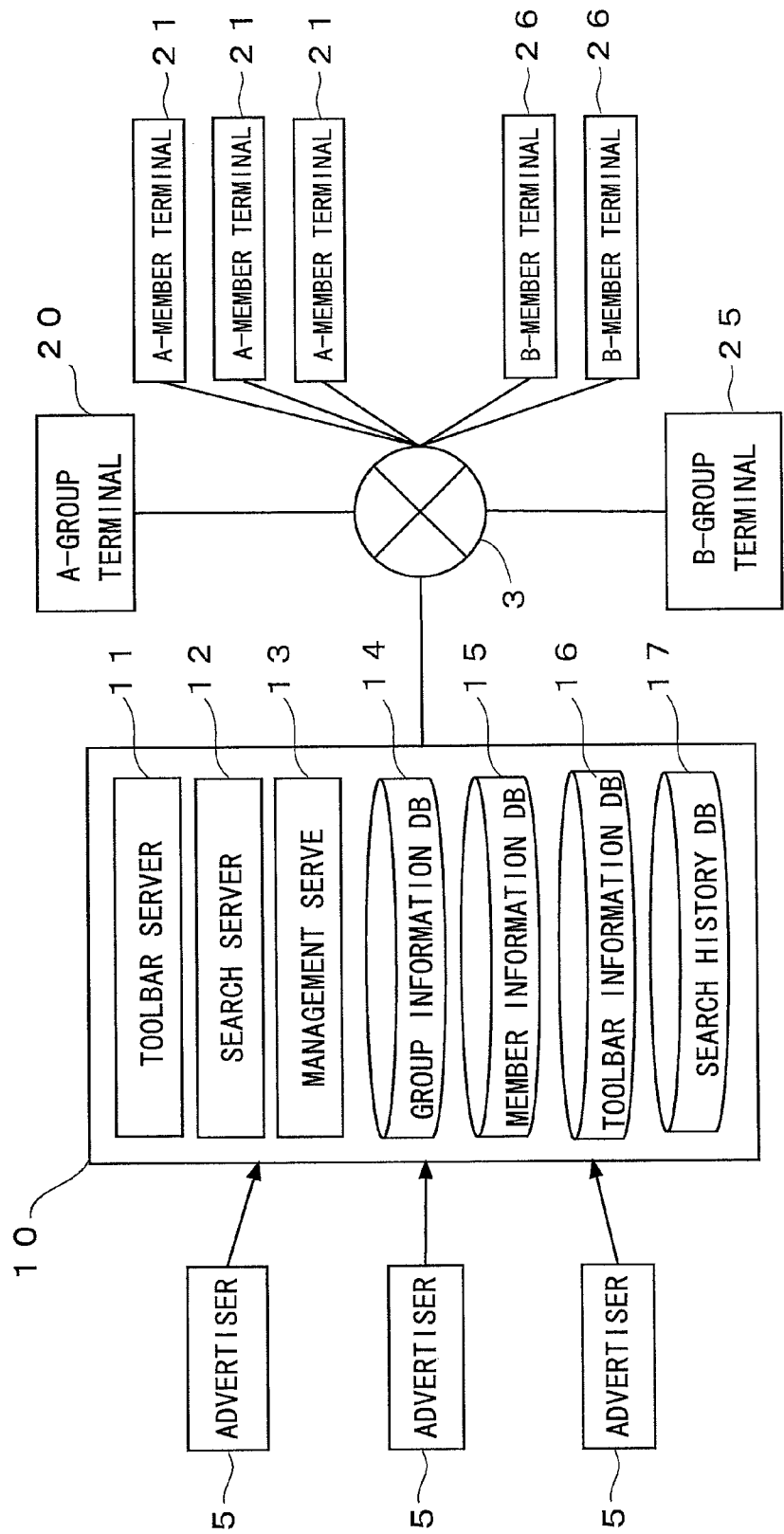
FIG. 1 is a schematic diagram showing an example of a schematic configuration of a server system in accordance with a first embodiment of the invention.

FIG. 1 is a schematic diagram showing an example of the schematic configuration of the information processing server system in accordance with the first embodiment of the invention.

As shown in FIG. 1, an information processing server system 10 includes a toolbar server 11 that executes issue processing, storage processing, and the like of a toolbar that is used for search in a web browser displayed on a screen of a terminal of a member, a search server 12 that searches a search object on a network on the basis of a search request, and a management server 13 that receives the search request from the terminal of the member and executes information processing, and these servers are connected to each other by a local area network and the like. These severs may exist at a different site and may be connected to each other by a network 3.

The information processing server system 10 includes a group information database (group information storage means) 14 that receives information associated with each of the groups and stores the information, a member information database (member information storage means) 15 that receives information associated with a member from the member and stores the information associating with each of the groups, and a toolbar information database (toolbar information storage means) 16 that stores toolbar identification information associated with and allocated to each the groups. The information processing server system 10 further includes a search history database (search history storage means) 17 that stores the search request of the member as a history.

In this case, the toolbar is a kind of menu where buttons, boxes, and the like having functions used by a user are arranged to simplify the functions and is installed in (plugged in) a web browser and the like for use. In this embodiment, the toolbar has a function of performing a search request of a search object on a network, on the basis of a search keyword input to an entry field for search, such as a search box of the toolbar.

The information processing server system 10 is connected to a system of an advertiser 5 who pays advertisement charges, a group terminal 20 of an A-group to execute processing for generating or distributing a toolbar for the A-group, a group terminal 25 of a B-group to execute processing for generating or distributing a toolbar for the B-group, plural member terminals 21 of members who belong to the A-group, and plural member terminals 26 who belong to the B-group through the network 3. In the example of FIG. 1, the members who belong to the A-group and the members who belong to the B-group are completely independent from each other. Among the members, there are the members who belong to the plural groups. The group may be a Nonprofit Organization (NPO), an association or a group that is sponsored by an individual person and a form of the group is not limited. The members may be the users who install the toolbar generated by each of the groups in the web browser and the like and use the toolbar.

The toolbar server 11 has a control unit or a database (not shown in the drawings). In the database, toolbar generating software, software to register each of groups, software to register each of members, and the toolbars that are generated by the group terminals 20 and 25 are stored.

The search server 12 functions as a search engine, searches a search object such as a web page on the basis of a received search keyword, and returns a search result.

In the group information database 14, a group name, a group address, a telephone number, a representative, and the like are stored as an example of information associated with each of the groups to be received from each of the groups at the time of registering the groups. In the member information database 15, a member name, a member address, a telephone number, and the like are stored as an example of information associated with the member to be received from the member at the time of registering the member. In the member information database 15, member identification information such as a member Identification (ID) to identify the member who belongs to each of the groups is associated with each of the groups and is stored. In the toolbar information database 16, toolbar identification information that is associated with and allocated to each of the groups is stored. In the search history database 17, a search keyword or the like that uses a search request of each of members is stored as a history.

Next, a configuration and a function of the management server 13 will be described on the basis of the drawings.

Figure 2:
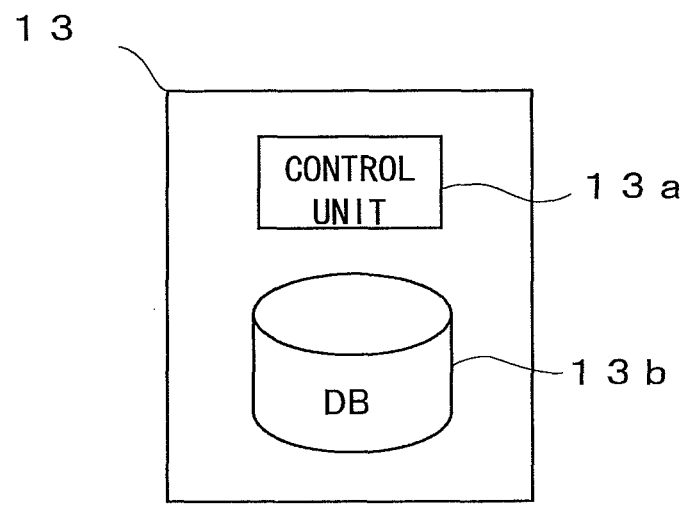
FIG. 2 is a block diagram showing an example of a schematic configuration of a management server of FIG. 1.

FIG. 2 is a block diagram showing an example of a schematic configuration of a management server.

As shown in FIG. 2, the management server 13 that functions as a computer includes a control unit 13a that controls the entire management server 13 or executes an operation of information processing, and a database 13b that stores an operation result of the control unit 13a or stores user information of each group, each of members, and the like. The management server 13 functions as an example of an information processing apparatus that receives information from the member terminals 21 and 26 and processes the information. Also, the management server 13 functions as a web server that converts a search result into a markup language such as a HyperText Markup Language (HTML) or an Extensible Markup Language (XML) and transmits a conversion result to each terminal. The management server 13 has a function of evaluating information related to advertisement charges from a system on the side of the advertiser 5 or support money, to count resources such as points distributed to the groups or the members.

The control unit 13a has a Central Processing Unit (CPU), a Random Access Memory (RAM), and the like, receives the search request and the like from the member terminals 21 and 26, requests the search server 12 to search information, obtains information related to the groups or information related to the members from the toolbar server 11 and stores the information in the database 13b. The control unit 13a functions as an example of a receiving means that receives the search request including the search keyword input to the entry field for search in the toolbar displayed on the screen of each of the member terminals 21 and 26, and the toolbar identification information associated with each of the groups to which the member performing the search using the toolbar belongs and allocated to each of the groups, or the member identification information to identify the member performing the search using the toolbar, from the member terminals 21 and 26. The control unit 13a functions as an example of a evaluating means that refers to the member information storage unit 15 functioning as the member information storage means, identifies the member on the basis of the member identification information, and counts the member search request for each of members by accumulating a search history of the search request for each of members. The control unit 13a functions as an example of a evaluating means that refers to the toolbar information database 16 functioning as the toolbar storage means, and counts the group search request as each of the groups by counting the member search request on the basis of the toolbar identification information.

The search history includes information that can be obtained by the management server 13 together with the search request, such as having search or not, the search keyword, and a date and time of the search request, in addition to the number of search request. In the case where the search is requested without inputting the search keyword, execution of the search is stored as the history and the number of search request is not counted.

The database 13b has a hard disk drive and the like and stores the counting result in the control unit 13a, the information related to the group, the information related to the member, and the like. The database 13b functions as an example of a counting result storage means that stores the counting result of the control unit 13a.

The database 13b may include a group information database 14, a member information database 15, and a toolbar information database 16. A search history database (search history storage means) 17 may be generated in the database 13b.

Figure 3:
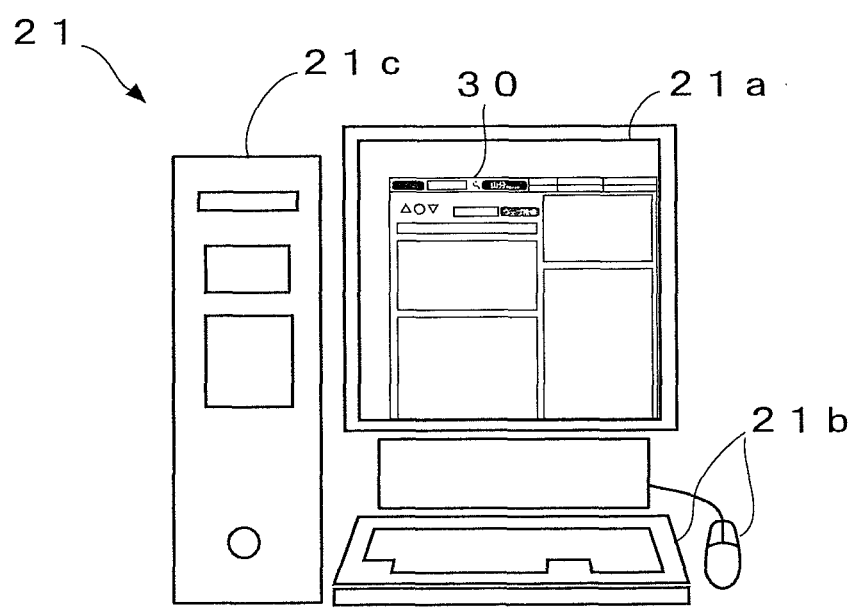
FIG. 3 is a block diagram showing an example of a schematic configuration of a member terminal of FIG. 1.

Next, a configuration and a function of the member terminal 21 will be described on the basis of the drawings. FIG. 3 is a block diagram showing an example of a schematic configuration of a member terminal. The member terminal 26 also has the same configuration or function.

As shown in FIG. 3, the member terminal 21 has a display unit 21a that displays a toolbar, an operation unit 21b that inputs a search keyword, and a terminal body 21c that displays information on the display unit 21a or receives an input from the operation unit 21b.

The display unit 21a is configured by a Cathode Ray Tube (CRT), a liquid crystal display element, an Electro Luminescence (EL) element, or the like. As shown in FIG. 3, on a screen of the display unit 21a, a toolbar 30 that is embedded in the vicinity of an upper portion of an open web browser (browser) is displayed.

The operation unit 21b is configured by a keyboard to input a search keyword, a logic symbol, and the like or a mouse and the like to press a search button.

The terminal body 21c has a CPU, a RAM, a Read Only Memory (ROM), a hard disk drive, and the like, and controls the individual units and executes various kinds of information processings. The terminal body 21c has a communication function of communicating the management server 13 and the like through the network 3, and transmits a search request to the management server 13 or displays a search result received from the management server 13 on the screen of the display unit 21a.

Next, a configuration and a function of the toolbar 30 will be descried on the basis of the drawings.

Figure 4:
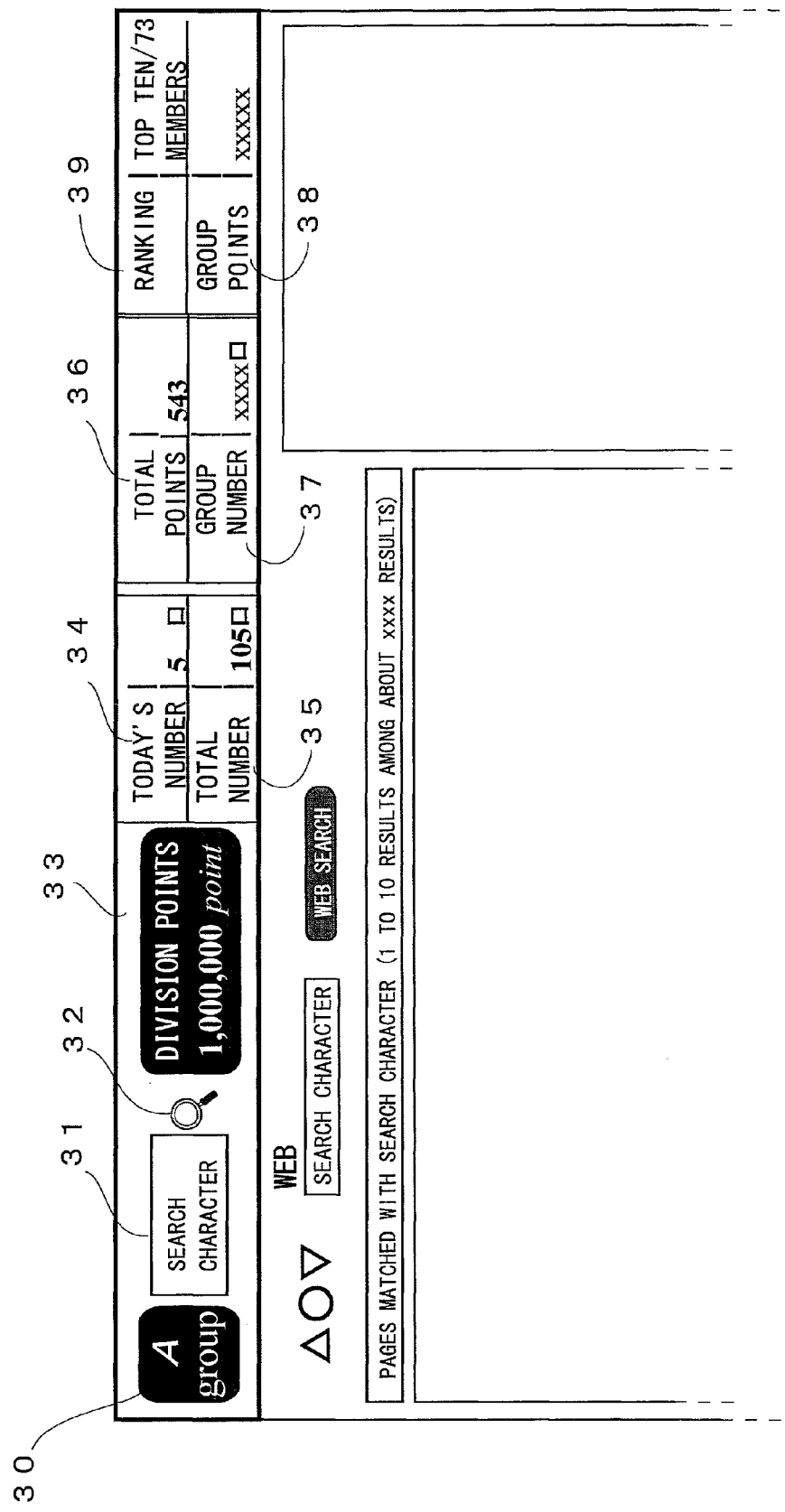
FIG. 4 is a schematic diagram showing an example of a toolbar that is displayed on a screen of the member terminal of FIG. 1.

FIG. 4 is a schematic diagram showing an example of a toolbar that is displayed on a screen of the member terminal.

As shown in FIG. 4, the toolbar 30 has a search box 31 that is an example of an entry field for search, a search button 32 that is needed to request for search after inputting a search keyword to the search box 31, a division point field 33 that displays division points to be an example of member total points distributable to the members, a today's number field 34 that displays the today's number of member search of the members using the toolbar 30, a total number field 35 that displays the accumulated total number of member search of the members, a total point field 36 that displays member points, a group number field 37 that displays the total number of search of the A-group, a group point field 38 that displays group points, and a member ranking field 39 that displays the ranking of the number of member search of the members in the A-group. A-group logo that is used to state connection with the group is added to the toolbar 30. In this case, the member total points mean points that correspond to resources distributable to the members, among resources such as advertisement charges collected from the advertiser 5. Specifically, the member total points mean a total sum of points that are distributed to each of members. If the resources such as the advertisement charges allocated to the groups are distributed to the management side, the groups, and each of members, the member total points become points that are obtained by subtracting a commission of the management side or points distributed to the groups from the resources. Since the member total points are divided among the members, the member total points are called the division points. The division is not limited to the case where the same points are distributed to each of members, and the points may be distributed in accordance with the number of member search and may be differently distributed to each of members.

The search box 31 becomes a state where the search keyword can be input by the keyboard of the operation unit 21b by moving a pointer displayed on the display unit 21a to the search box 31 by the mouse of the operation unit 21b and clicking the search box 31.

The search button 32 has a function of a push button that is clicked by the mouse of the operation unit 21b and the like and executes an operation for transmitting the search keyword and the like input to the search box 31 to the management server 13.

In the today's number field 34, as an example of the member search number, the search number searched by each of members by the present time is displayed as numbers. In the total number field 35, as an example of the member search number, the accumulated total of search number of each of members is displayed as numbers. In the total point field 36, as an example of the member points, points that are acquired by each of members are displayed. In the group number field 37, as an example of the number of group search, the number of search searched by all the members of the A-group is displayed as the number. In the group point field 38, as an example of the group points, accumulated total points in the group that are generated to the group by the search of each of members are displayed. In the member ranking field 39, ranking of the number of search of each of members in the group and the number of members in the group are displayed.

As such, in the display field such as the today's number field 34, the result is displayed on the basis of the information received from the management server 13. The points have cashability that enables a product to be purchased by the acquired points. Since points provided to the member or to the group are changed by bonus points at the time of a campaign or an increase/decrease of advertisement charges from the advertiser 5, the accumulated total points are not necessarily proportional to the number of search. The points that correspond to the advertisement charges from the advertiser 5 are distributed to each of members and the group or the management side. A distribution ratio is previously determined by a contract and the like. However, the distribution ratio may be changed in accordance with the total number of search.

In this case, a method of generating the toolbar 30 will be simply described.

When the toolbar 30 is generated, a manager or the like of the group has access to the toolbar server 11 on the group terminals 20 and 25, executes the toolbar generating software, and generates a unique toolbar of the group. For example, the toolbar 30 for the A-group has a form of a button of a Graphical User Interface (GUI) that has a basic form or a function of the toolbar. By an operation on the web browser on the side of the group terminal 20, the manager or the like of the group terminal 20 performs dragging using a mouse and the like, selects a check box of a list such as a button or generates a logo of the group to generate the toolbar. The manager registers the group using the group registration software, acquires a toolbar ID for the A-group, and embeds the toolbar ID into the toolbar 30. The toolbar ID is an example of toolbar identification information that is associated with each of the groups to which the member performing the search using the toolbar 30 or the like belongs and allocated to each of groups. Similar to the above case, the manager of the group terminal 25 acquires a toolbar ID for the B-group and embeds the toolbar ID into the toolbar for the B-group. As such, in the case where the plural groups exist, different toolbar identification information is allocated to each of groups.

When the group is registered, the information such as the group name that is associated with the group is stored in the group information database 14 and is associated with the toolbar ID. The toolbar ID is transmitted to the management server 13 and is stored in the database 13b, the toolbar information database 16 and the like by the control unit 13a of the management server 13. The generated toolbar 30 or the like is stored in the database of the toolbar server 11. In the case where the group has the server, the toolbar 30 may be stored in the server of the A-group.

Next, the user who wants to participate in the A-group has access to the web page and the like of the A-group, performs member registration, and acquires a member ID. The member ID is an example of the member identification information to identify the member performing the search using the toolbar 30. The member ID is transmitted to the management server 13 and is stored in the database 13b or the member information database 15 by the control unit 13a of the management server 13. When the member registration is performed, the information such as the member name that is associated with the member is stored in the member information database 15 and is associated with the member ID or the A-group.

Next, the user downloads an installation file of the toolbar 30 from the database of the tool server 11, the server of the A-group, or the like. When the user installs the toolbar 30 in the web browser, the user inputs the member ID and installs the toolbar. At this time, the member ID is recorded in the toolbar 30. When the user performs member registration of the group, the user may embed the member ID in the toolbar 30 or the installation file of the toolbar 30. In this case, in the case where the user installs the toolbar 30, the user can omit an input of the member ID. As such, the toolbar server 11 functions as a toolbar providing means that provides the toolbar identification information to each of the groups and issues the toolbar 30.

The group may distribute an installer of the toolbar 30 to each of members through an e-mail and the like or inform a Uniform Resource Locator (URL) where the installer exists.

Next, a configuration and a function of a data format of a search query that is transmitted from the member terminals 21 and 26 to the management server 13 will be described on the basis of the drawings.

Figure 5:
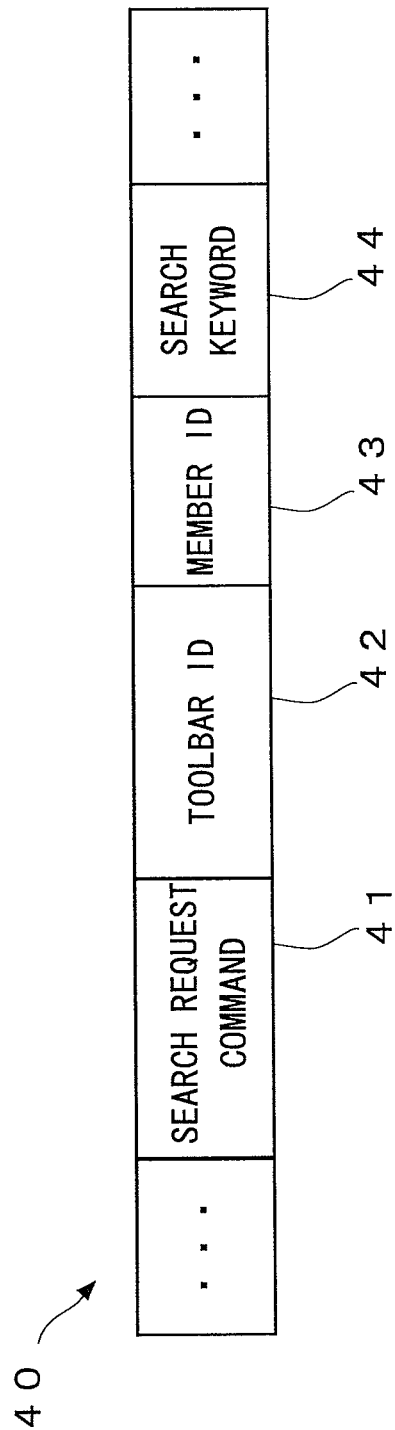
FIG. 5 is a schematic diagram showing an example of data format of a search request from the member terminal of FIG. 1.

FIG. 5 is a schematic diagram showing an example of the data format of a search query from the member terminal.

As shown in FIG. 5, a data 40 of the query has a search request command 41 to request for search through a search engine, a toolbar ID 42 to identify a group to which the toolbar corresponds, a member ID 43 to identify a member, and a search keyword 44 that is input to the search box 31.

The data 40 of the query is generated in the terminal body 21c, on the basis of the search keyword 44, the toolbar ID 42, the member ID 43, and the like input to the search box 31, when the member clicks the search button 32, and the data is transmitted to the management server 13. The data format of the query that is received by the management server 13 is previously determined.

Next, an operation in accordance with this embodiment will be described on the basis of the drawings. The case where the member of the A-group performs the search using the toolbar 30 displayed on the screen of the member terminal 21 will be described.

First, calculation of the division points that are the example of the member total points will be described on the basis of the drawings.

Figure 6:
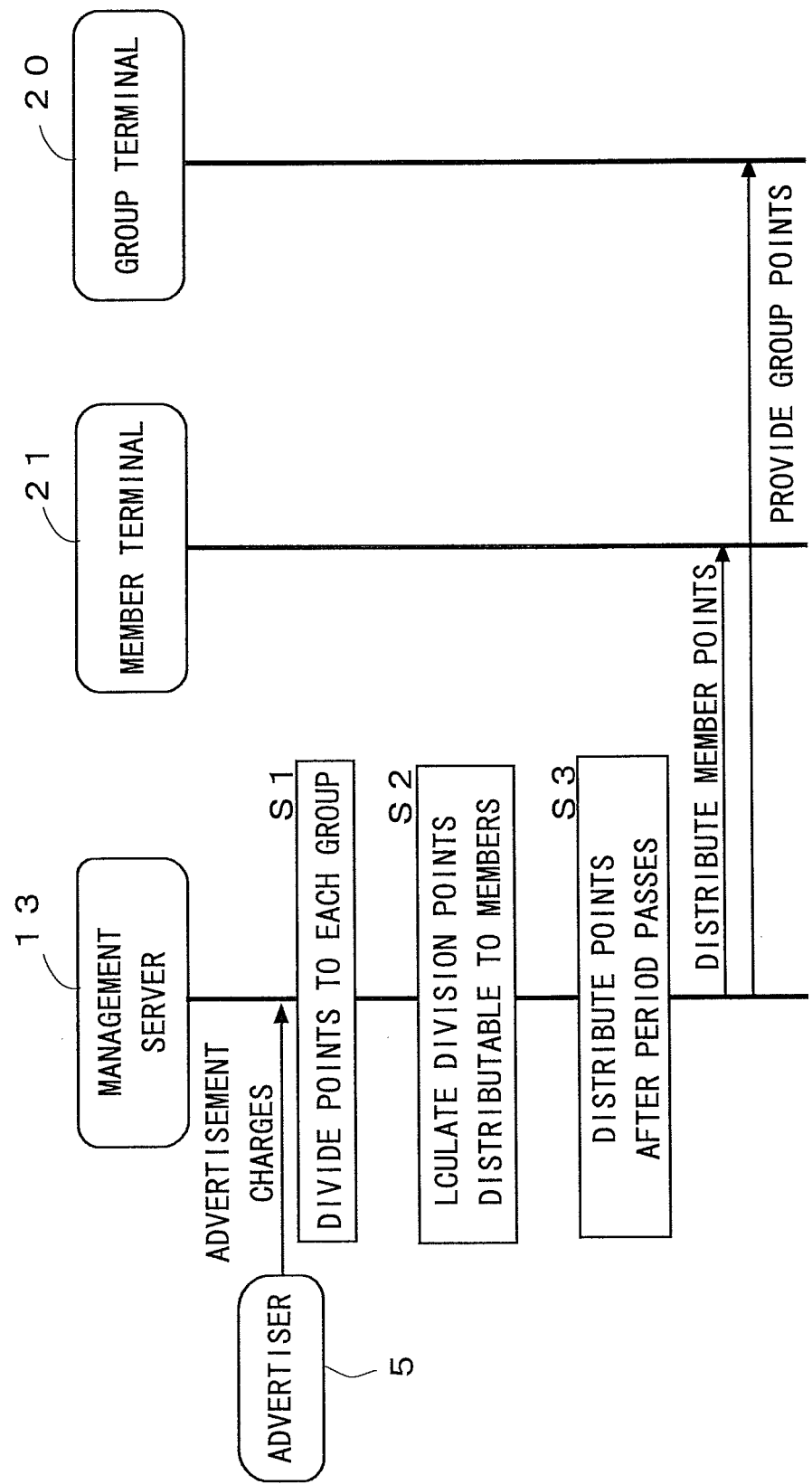
FIG. 6 is a sequence diagram showing an example of an operation of calculating member total points in the management server of FIG. 1.

FIG. 6 is a sequence diagram showing an example of an operation of calculating member total points in the management server.

The management server 13 receives the advertisement charges corresponding to the resources of the points from each advertiser 5 and the control unit 13a divides the advertisement charges for each of the groups (step S1). The control unit 13a determines a relationship between the advertisement charges and each of the groups and divides the advertisement charges. The control unit 13a may divide the advertisement charges dynamically in accordance with actual results such as the number of group search. The advertisement charges may be the expected amount or the collection amount of support money.

Next, the control unit 13a calculates the division points that are an example of the member total points distributable to the members, from the divided advertisement charges and the like (step S2). For example, the control unit 13a remains the management charges in the management server 12 and sets the initial division points from the other points, on the basis of the number of group search counted during a past constant period. The divided advertisement charges and the like are distributed to a commission of the management side, the member, and the group. The initial division points may be set in accordance with actual results or contracts of the other groups. As such, the control unit 13a has a function as a total point calculating means that sets the initial member total points, on the basis of the group search request counted during the past constant period.

Next, the control unit 13a distributes the member points from the division points to the member terminal 21, in accordance with the actual result of the search using the toolbar 30, after the previously set division object period passes (step S3). For example, the control unit 13a sets a period of each week or month, or a campaign period as the previously set division object period, and performs division. The control unit 13a provides the group points to the group terminal 20 in accordance with the group number, from the points other than the commission of the management side and the division points. The control unit 13a may distribute the points little by little for each search or distribute the points in accordance with the group number, by the day, by the week, and the like.

Next, an operation of the management server accompanied by the search using the toolbar 30 will be described.

Figure 7:
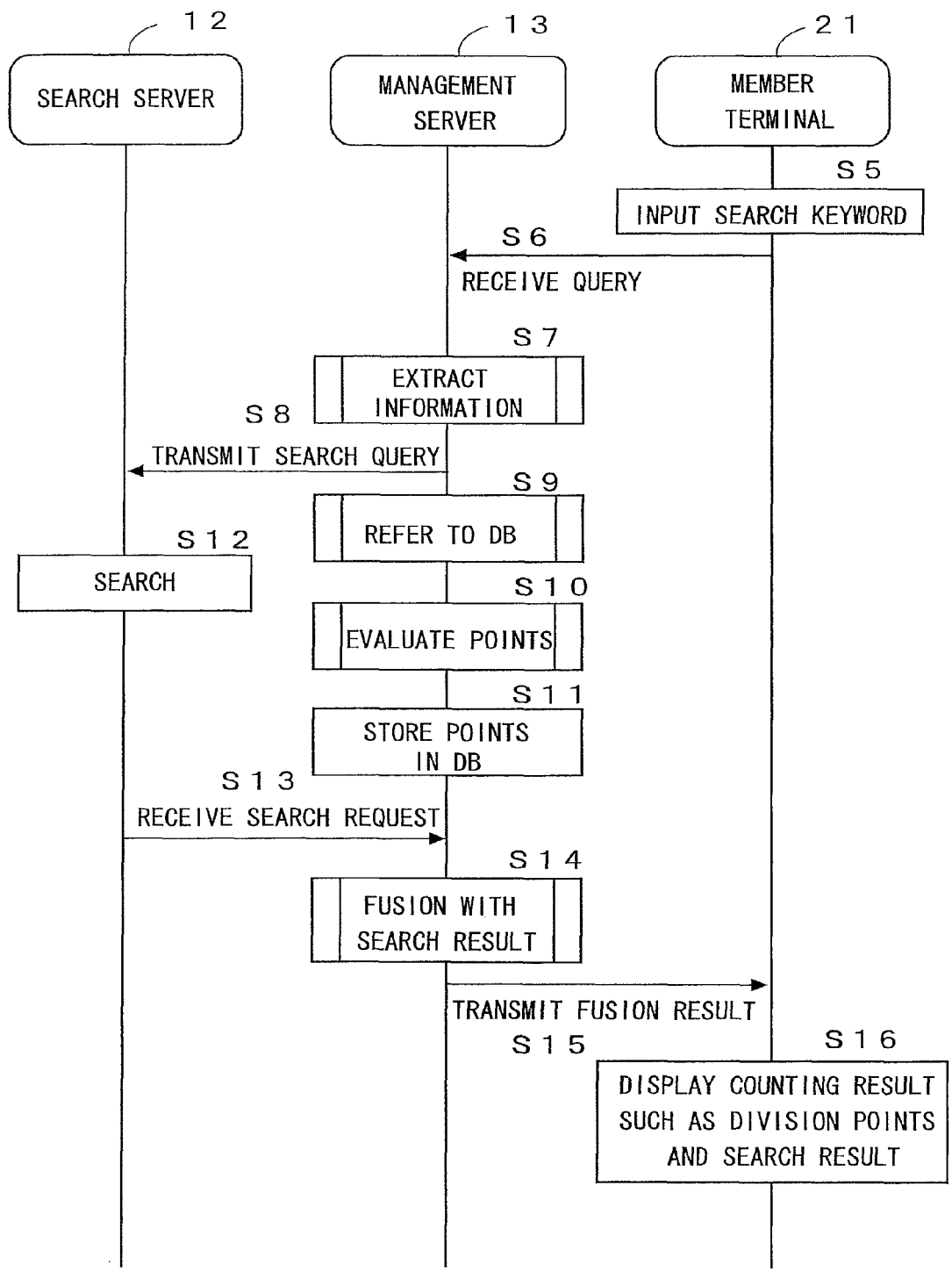
FIG. 7 is a sequence diagram showing an example of an operation of the management server of FIG. 1.

FIG. 7 is a sequence diagram showing an example of an operation of the management server.

In step S2, after the initial division points are set, as shown in FIG. 7, the member terminal 21 receives an input of the search keyword 44 (step S5). Specifically, the member inputs the certain search keyword 44 to the search box 31 of the toolbar 30 that is displayed on the screen of the display unit 21a of the member terminal 21 and presses the search button 32. At this time, as shown in FIG. 5, the member terminal 21 generates the data 40 of the query and transmits the data to the management server 13.

Next, the control unit 13a of the management server 13 receives the data 40 of the query from the member terminal 21 (step S6). When the data is received, the control unit 13a stores a search history such as the search keyword or the search request date and time in the search history database 17.

The control unit 13a executes a subroutine to extract information such as the toolbar ID 42, the member ID 43 or the search query from the data 40 of the query (step S7). The extraction of the information such as the toolbar ID 42 will be described in detail below.

Next, the control unit 13a transmits the search query to the search server 12 (step S8). The control unit 13a refers to the database such as the database 13b, the toolbar information database 16 or the search history database 17, on the basis of the extracted toolbar ID 42 or member ID 43, and executes a subroutine to read the total points corresponding to the toolbar ID and the like (step S9). The reference of the database will be described in detail below.

Next, the control unit 13a executes a subroutine to evaluate the number of search, the points, or the like to display on the display field such as the today's number field 34 of the toolbar 30 (step S10). At this time, the control unit 13a also determines whether the division points are updated. The evaluating of the points or the like will be described in detail below.

After the number of searches, the points, or the like is evaluated, the control unit 13a stores the counting result such as the points in the database 13b (step S11). Specifically, the control unit 13a stores the counting result in a predetermined place of the database 13b, on the basis of the toolbar ID 42 or the member ID 43. As such, the control unit 13a stores the counting result of each toolbar ID for each toolbar ID.

Meanwhile, the search server 12 searches the search object on the basis of the search keyword 44 and transmits the search result to the management server 13 (step S12). The control unit 13a receives the search result from the search server 12 (step S13).

Next, the control unit 13a executes a subroutine to fuse data of the counting result and data of the search result (step S14). The fusion of the data will be described in detail below. The control unit 13a collects the counting result including information of the division point and the search result as the fusion result and transmits the fusion result to the member terminal 21 (step S15). As such, the control unit 13a functions as a transmitting means that transmits information of the member total points to the terminal.

Next, the member terminal 21 receives the fusion result from the management server 13, divides the fusion result into the search result and the counting result including the division points, and displays the search result and the counting result on the display unit 21a (step S16). For example, as shown in FIG. 4, the counting result is displayed on the toolbar 30 and the search result is displayed on the browser.

Next, each subroutine will be described.

First, the extraction of the information of step S7 will be described in detail.

Figure 8:
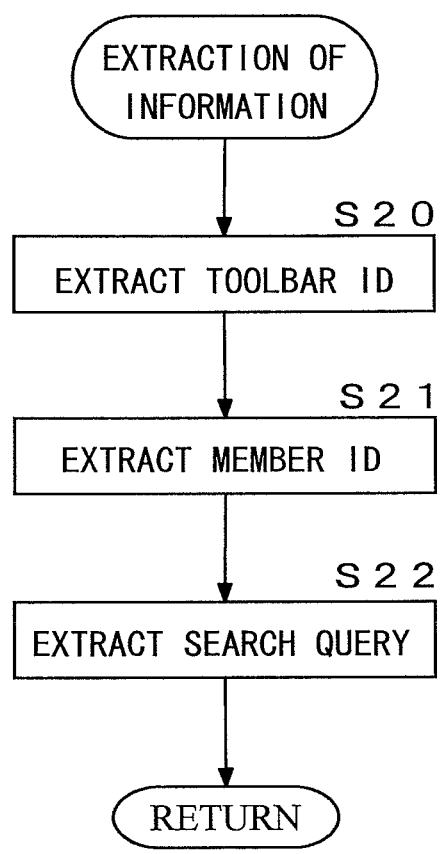
FIG. 8 is a flowchart showing a subroutine of an example of an operation of extracting information in the management server of FIG. 1.

FIG. 8 is a subroutine showing an example of an operation of extracting information in the management server.

As shown in FIG. 8, after the query is received from the member terminal 21 in step S6, the control unit 13a extracts the toolbar ID from the query (step S20), and extracts the member ID from the query (step S21). Specifically, in the case where the command of the received query is the search request command 41, the control unit 13a extracts the toolbar ID 42 from the place of the toolbar ID of the data 40 and extracts the member ID 43 from the place of the member ID, in accordance with the data format of the data 40 of the query. Since the data position or the data length of each object can be known, the place of the toolbar ID 42 or the member ID 43 can be identified. The processing of referring to the database of step S9 is executed, on the basis of the extracted toolbar ID 42 or member ID 43.

Next, the control unit 13a generates a search query for the search server 12, on the basis of the query received from the member terminal 21 (step S22). Specifically, the control unit 13a generates the search query in accordance with the format for transmission to the search server 12, on the basis of the search request command 41 and the search keyword 44. The generated search query is transmitted to the search server 12 in step S8.

Next, the referring to the database of step S9 will be described in detail.

Figure 9:
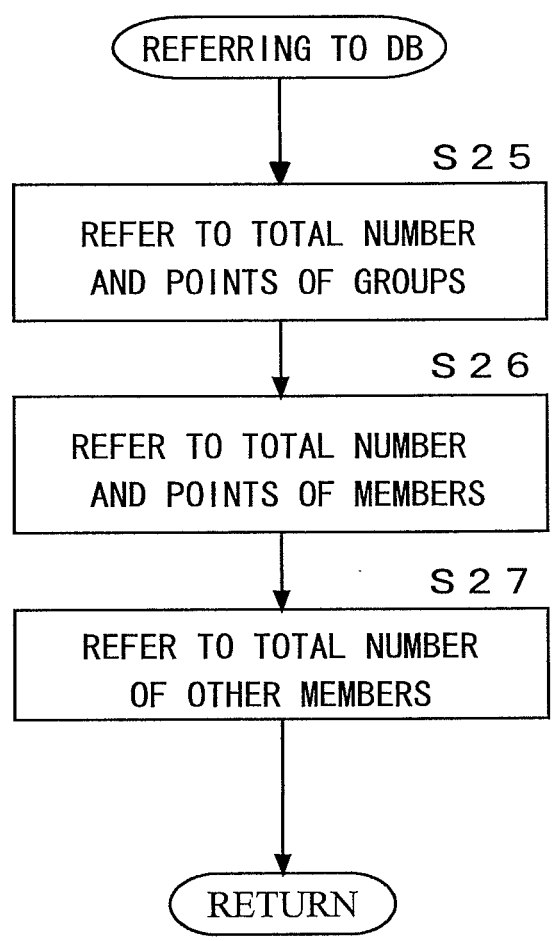
FIG. 9 is a flowchart showing a subroutine of an example of an operation of referring to a database in the management server of FIG. 1.

FIG. 9 is a subroutine showing an example of an operation of referring to a database in the management server.

As shown in FIG. 9, after various information is extracted from the query in step S7, the control unit 13a refers to and reads the total number of the group and the group points that are stored in the database such as the database 13b, the toolbar information database 16 or the search history database 17, on the basis of the extracted information (step S25). Specifically, the control unit 13a identifies the group through collation with the toolbar ID stored in the database such as the toolbar information database 16. The control unit 13a obtains the history of the search request such as the total number of the A-group corresponding to the toolbar ID 42 or the group points from the database such as the database 13b or the search history database 17, on the basis of the toolbar ID 42. As such, the control unit 13a functions as an example of a evaluating means that refers to the toolbar storage means such as the toolbar information database 16, identifies the group on the basis of the toolbar ID 42, accumulates the history of the search request of the database such as the database 13b or the search history database 17 for each of the groups, and counts the search request as the group.

The control unit 13a acquires the total number (total search number) of the members stored in the database such as the database 13b or the search history database 17 and the member points (step S26). Specifically, the control unit 13a reads the total number of the members corresponding to the member ID 43 and the member points, on the basis of the member ID 43. If the control unit 13*a* narrows the members belonging to the A-group on the basis of the toolbar ID 42 and identifies the member who requests the search on the basis of the member ID 43, the control unit 13*a* can have access to the database 13*b* fast.

Next, the control unit 13*a* refers to and reads the total number of the other members that are stored in the database 13*b* (step S27). Specifically, the control unit 13*a* reads the total number of each of members who belongs to the A-group corresponding to the toolbar ID 42, on the basis of the toolbar ID 42. As such, the data that is read from the database 13*b* is used in the point evaluating processing of step S10.

Next, the point evaluating of step S10 will be described in detail.

Figure 10:
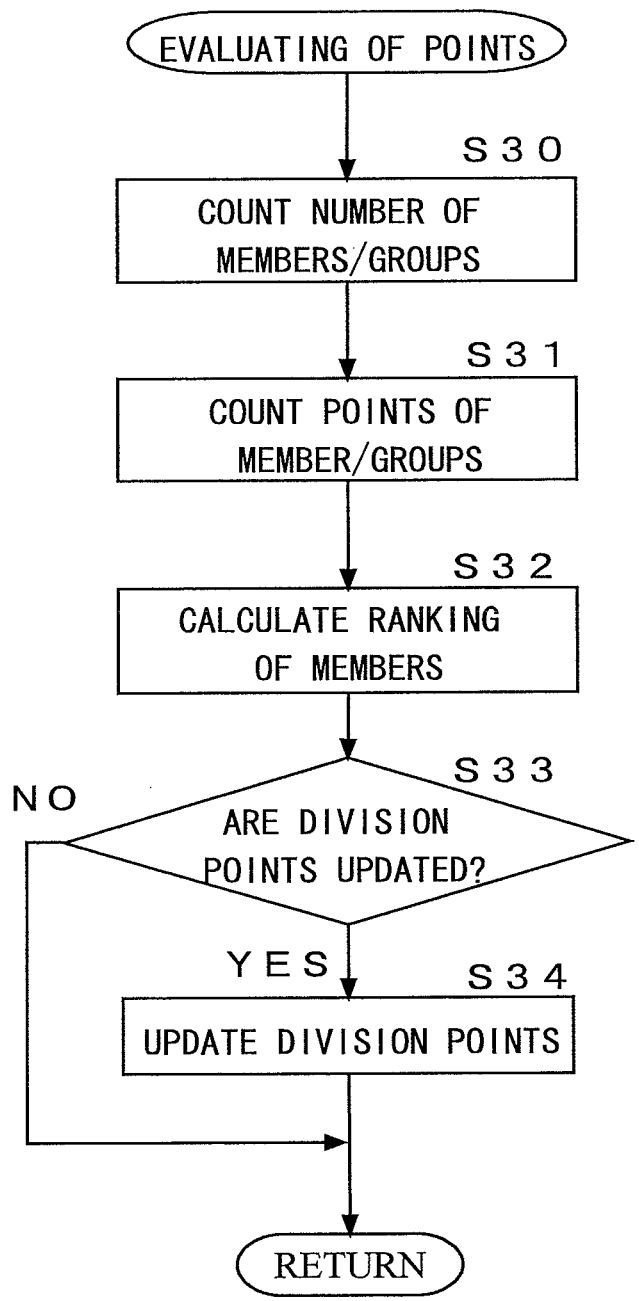
FIG. 10 is a flowchart showing a subroutine of an example of an operation of evaluating points and the like in the management server of FIG. 1.

FIG. 10 is a subroutine showing an example of an operation of evaluating points and the like in the management server.

As shown in FIG. 10, after the member number and the group number are read from the database 13*b* in step S9, the control unit 13*a* counts the newest member number and group number (step S30). Specifically, the control unit 13*a* adds 1 to each of the member number and the group number read from the database 13*b* in steps S25 and S26. That is, the control unit 13*a* counts the member number corresponding to the member ID and the group number corresponding to the toolbar ID.

As such, the control unit 13*a* counts the search request as the group and counts the number of group search of each of the groups. The control unit 13*a* refers to the database 13*b*, identifies the member on the basis of the member ID, counts the number of search request, and counts the member number as the number of member search of each of members. In the case where the plural groups exist, the control unit 13*a* refers to the database 13*b* and counts the number of group search for each toolbar ID, on the basis of the toolbar ID. For example, the control unit 13*a* counts the group number for each of the plural groups such as the A-group and the B-group, on the basis of the toolbar ID of each of the groups.

Next, the control unit 13*a* counts the member points and the group points (step S31). Specifically, as indicated in step S3, after the division object period passes, the control unit 13*a* divides the division points in accordance with the actual result of the search using the toolbar 30 and counts the member points by the division finally. Therefore, the control unit 13*a* determines whether the division object period passes. When it is determined that the division object period passes, the control unit 13*a* counts the points divided to the members, on the basis of the member search request such as the search number of the member during the division object period. The control unit 13*a* adds the counted points to the member points read in steps S25 and S26. As such, the control unit 13*a* functions as an example of an evaluating means that counts the member points of each of members distributed from the member total points to each of members, on the basis of the member search request.

After the division object period passes, the control unit 13*a* counts points that are obtained by subtracting the commission of the management side and the division points from the resources such as the advertisement charges and correspond to group points distributable to the group. For example, the control unit 13*a* counts the group points at timing when any member belonging to the group first performs the search, after the division object period passes. The control unit 13*a* adds the counted group points to the group points read in steps S25 and 26. The group points that can be distributed to the group are tentatively fixed as points obtained by subtracting the commission of the management side and the division points from the resources such as the advertisement charges, when the division object period starts. However, as described below, since the division points may be updated, the control unit 13*a* finally counts the group points after the division object period passes.

The control unit 13*a* may count the member points as prospective member points, whenever the search is performed. Examples of the prospective member points include a value that is obtained by multiplying a value obtained by dividing a current member number by a current group number with the division points. Since the prospective member points are not the fixed points, the prospective member points are not added to the member points read in steps S25 and S26 and are differently displayed as the prospective member points.

The distributed points per search on the basis of the contact and the like may be added to each of the member points and the group points read in steps S25 and S26, on the basis of the member number or the group number. In this case, since the advertisement charges collected from each advertiser 5 have the upper limit of the points as the resources, the upper limit of the points that are provided to the member in a day is set or the points that are provided to the number of search are increased during a campaign period.

A maximum value of the group points is the value that is obtained by subtracting the commission of the management side and the division points from the resources such as the advertisement charges. However, the group points may be displayed to be increased in accordance with the group number gradually increasing by the search of each of members and the points that are obtained by subtracting the commission of the management side and the division points from the resources such as the advertisement charges may be finally provided as the group points.

Next, the control unit 13*a* calculates the ranking of the member (step S32). Specifically, the control unit 13*a* compares the member number counted in step S30 with another member number read from the database 13*b* in step S27 and calculates the ranking of the member. The control unit 13*a* also calculates the number of members who belong to the A-group at the present time. The ranking of the members and the member number are displayed on the member ranking field 39.

Next, the control unit 13*a* determines whether the division points are updated (step S33). Specifically, the control unit 13*a* determines whether the counted group number exceeds the previously set threshold value. The number of search of the threshold value is set on the basis of the group number counted during the past constant period. For example, the control unit 13*a* sets the threshold value by the contact and the like with the advertiser 5, on the basis of the actual result or the inclination of the group number during the last month, the last year or the previous campaign period, and determines addition of the advertisement charges needed to increase the division points, even though the advertisement period does not end. In particular, in the case where a new group is set up, the number of search of a threshold value may be set in accordance with the actual result in another group or the search history of the existing search engine. The plural threshold values may be set in accordance with the group number.

Next, if the counted group number exceeds the threshold value (Yes in step S33), the control unit 13*a* updates the division points (step S34). Specifically, if the counted group number exceeds the previously set threshold value, the control unit 13*a* increases the division points and updates the division points. The control unit 13*a* may update the division points to be proportional to the group number.

Meanwhile, if the counted group number does not exceed the previously set threshold value (No in step S33), the control unit 13a ends the subroutine without updating the division points.

If the member number is counted, the control unit 13a stores the member number and the like in step S11. The counting result such as the member number that is used in step S14 may be stored in the RAM of the control unit 13a.

As such, the control unit 13a has a function as a total point calculating means that updates the member total point, on the basis of the counted group search request. The control unit 13a functions as the total point calculating means that updates the member total point, in the case where the number of group search exceeds the number of search of the threshold value. The control unit 13a functions as a means that calculates the number of search of the threshold value on the basis of the number of group search counted during the past constant period.

Next, the data fusion of step S14 will be described in detail.

Figure 11:
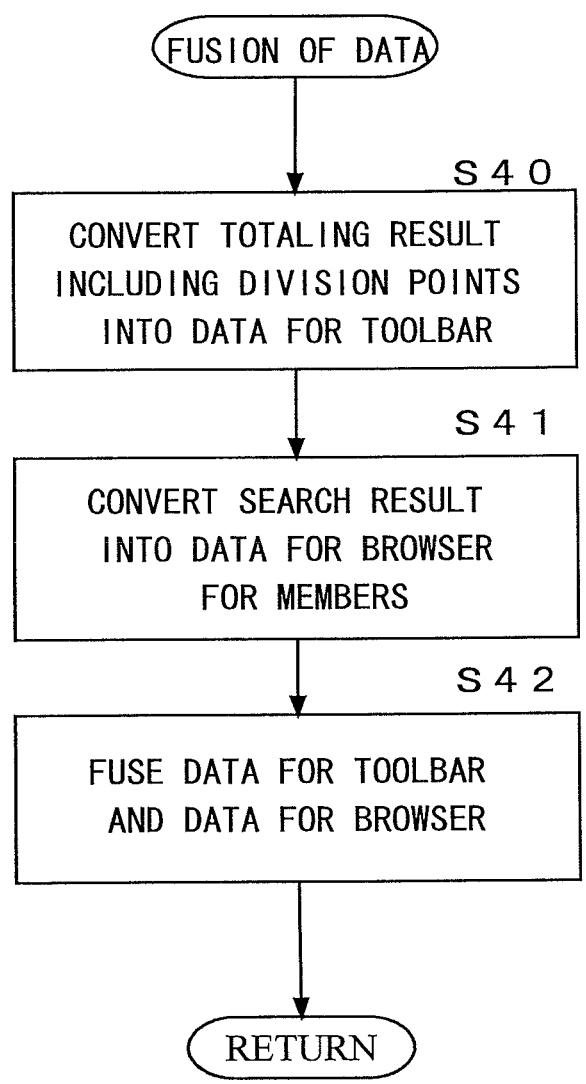
FIG. 11 is a flowchart showing a subroutine of an example of an operation of fusing data in the management server of FIG. 1.

FIG. 11 is a subroutine showing an example of an operation of fusing data in the management server.

As shown in FIG. 11, after the newest division points, member number, group number, or the like is evaluated in step S10, the control unit 13a converts the counting result including the division points into data for the toolbar 30 (step S40). Specifically, when the member terminal 21 receives the data, in a program of the browser, a header or the like that can determine the data for the toolbar 30 is provided. As such, the control unit 13a functions as an example of a data generating means that generates data having the format to display information of the member total point on the toolbar 30.

After the search result is received in step S13, the control unit 13a converts the search result into data for the browser used by the members (step S41). Specifically, the control unit 13a converts the search result into a markup language having the HTML format and the like.

After the counting result or the search result is converted, the control unit 13a fuses the data for the toolbar and the data for the browser (step S42). Specifically, the control unit 13a fuses the data for the toolbar corresponding to the counting result and the data for the browser corresponding to the search result, in accordance with the predetermined data format where the header is provided, such that the data is data displayed on the display field of the toolbar 30 or data displayed as a result screen of the search on the display surface of the browser, in the browser of the member terminal 21. The data that is fused in the above way is transmitted to the member terminal 21 in step S15.

As described above, the search using the toolbar 30 is repetitively performed by each of members, and as indicated in step S3 of FIG. 6, if the previously set division object period passes, the control unit 13a divides the division points to the members. Specifically, the control unit 13a multiplies the division points with the value obtained by dividing the member number with respect to the group number by the group number and calculates the distributed member points.

As such, in accordance with the invention, the management server 13 receives the search request including the search keyword input to the search box 31 in the toolbar 30 displayed on the screen of the display unit 21a of each of the plural member terminals 21, the toolbar ID 42 associated with and allocated to each of the groups, and the member ID 43 identifying the member from the member terminal 21, identifies the member on the basis of the member ID 43, counts the number of member search of each of members by accumulating a history of the search request for each of member, counts the number of group search as each of the groups by counting the number of search of each of the members belonging to the group on the basis of the toolbar ID 42, updates the division points distributable to the members on the basis of the counted number of group search, and transmits the information of the division points to the terminal. As a result, even when the member corresponding to the user uses the toolbar installed in the web browser and the like once and performs the search, the division points to which the number of group search where each of members search request from the members in each of members terminal 21 is counted is applied can be shown to the member. Therefore, easy use of the member and easy participation of the member as the group activity can be urged. For example, in order to increase the division points of the group to which each of members belongs, each of members may perform the search using the toolbar 30 or recruit the members to use the toolbar 30.

In the related art, the advertisement charges when the advertiser 5 advertises are determined by the cost-effectiveness of the past actual result. For this reason, in the case where access for the site of the advertiser is suddenly increased by some kind of opportunities and an expectation is missed, a standard advertisement effect and a real advertisement effect for the advertisement charges are mismatched with each other. In accordance with this embodiment, since the division points are updated in accordance with the number of group search, in the case where the advertisement of the advertiser 5 is put on the result screen with respect to the search using the toolbar 30, the advertisement charges and the advertisement effect can be matched with each other. If the division points increase, the increase of the participation of the member such as the search of the member is expected. If the participation increases, the advertisement effect increases, the motivation that causes the advertiser 5 to pay more advertisement charges becomes high.

Since the search request and the toolbar ID associated with the group are received, the total number of search of the members using the toolbar 30 can be automatically counted and the data of the group unit is obtained. Therefore, information processing and the like can be easily executed for each of the groups.

By providing the toolbar ID to each of the groups and issuing the toolbar 30, the members using the toolbar 30 can be automatically counted for each of the groups and the data of the group unit is obtained. Therefore, information processing and the like can be easily executed for each of the groups.

Since the data is collectively handled with respect to each of the groups instead of each of members, the number of group search can be known. In the case where the group number is informed to each of members, the search motivation of the members who contribute to the group becomes high and a feeling of solidarity between the members is easily generated. Since the number of group search with respect to the group such as the group number can be evaluated, the advertisement charges from the advertiser 5 with respect to the group can be easily obtained.

In the case where the control unit 13a of the management server 13 sets the initial division points on the basis of the number of group search counted during the past constant period, the division points that are proper to the cost-effectiveness can be set to the advertiser 5 or the member.

In the case where the number of group search exceeds the number of search of the threshold value and the division points are updated, the control unit 13a of the management server 13 increases the division points to exceed the number of search of the threshold value. Therefore, the motivation that causes each of members to perform the search using the toolbar 30 can be raised. In particular, if the number of search of the threshold value is displayed on the screen of the display unit 21a of the member terminal 21 as the target number of group search, the motivation of each of members can be raised.

In the case where the number of search of the threshold value is calculated on the basis of the number of group search counted during the past constant period, if the number of search exceeds the number of search of the threshold value even though the period during which the advertisement linked with the search set by the contract and the like is displayed does not end, the control unit 13a of the management server 13 updates the division points. Therefore, the points that are linked with the Page View (PV) of the advertisement display period and are proper to the advertisement effectiveness with respect to the search behavior of the member can be provided to the member and the group.

In the case where the control unit 13a of the management sever 13 receives the member ID to identify the member performing the search using the toolbar 30, identifies the member on the basis of the member ID, counts the number of search request, and counts the number of member search of each of members, the number of member search is displayed on the display field of the toolbar 30 like the today search number or the total number on the basis of the counted number of member search, each of members can determine the target number of search, and the motivation that causes the member to perform the search can be raised.

In the case where the control unit 13a of the management server 13 counts the group points as the group on the basis of the number of group search, the control unit 13a marks the number of group search in consideration of other elements. Therefore, each of members can easily evaluate the group what each of members can do as the group on the basis of the group points. Since the group points are based on the search behavior of each of members, a degree of contribution to the group can be known through the group points.

In the case where the control unit 13a of the management server 13 counts the member points of each of members on the basis of the number of member search, the control unit 13a marks the number of member search in consideration of other elements. Therefore, the member can easily perform the comparison, the determination, and the evaluation. For example, if the member points have exchangeability such that a product and the like can be purchased or discounted using the member points, each of members determines that the member points can be used for purchasing something, so that the evaluation becomes easy. As a result, the motivation that causes each of members to perform the search can be raised. Since the points are provided to each of members as reduction with respect to each of members, the motivation that causes each of members to use the search can be raised.

In the case where the control unit 13a of the management server 13 generates data having the format to display the counting result including the division points on the toolbar 30, the control unit 13a reflects the result of the search behavior in the toolbar 30 to raise the motivation that causes each of members to use the search.

The control unit 13a calculates a degree of contribution of each of members, calculates ranking and the like of each of members or displays the counting result on both the group and the member on the toolbar 30, on the basis of the counting results on both the group and the member like the number of group search and the number of member search, and the group points and the member points. Therefore, the spot of each of members in the group can be known, and a degree of contribution of each of members with respect to each of the groups becomes clear, each of members can be compared with the other members, and each of members can compete with the other members. Therefore, the motivation that causes each of members to use the search can be raised.

In accordance with this embodiment, in the case where plural kinds of toolbar IDs exist, the different toolbar IDs are provided to the A-group and the B-group and the like, respectively. The control unit 13a of the management server 13 counts the number of group search for each toolbar ID, on the basis of the toolbar ID, stores the counting result of each toolbar ID in the database 13b for each toolbar ID, and counts the number of search for each toolbar ID associated with each of the groups. Therefore, the source of the toolbar to be used can be known. The advertiser 5 can easily distribute the advertisement charges to each of the groups.

The number of search or the group points of the group to which each of members belongs is compared with the number of search or the group points of the other groups and the group to which each of members belongs can compete with the other groups. Therefore, the motivation that causes each of members to use the search can be raised.

Next, a modification of this embodiment will be described. The modification is different from this embodiment in only the data format configuration of the data 45 of the query and the other configuration is the same as that of this embodiment. The same components as those of this embodiment are denoted by the same reference numerals.

Figure 12:
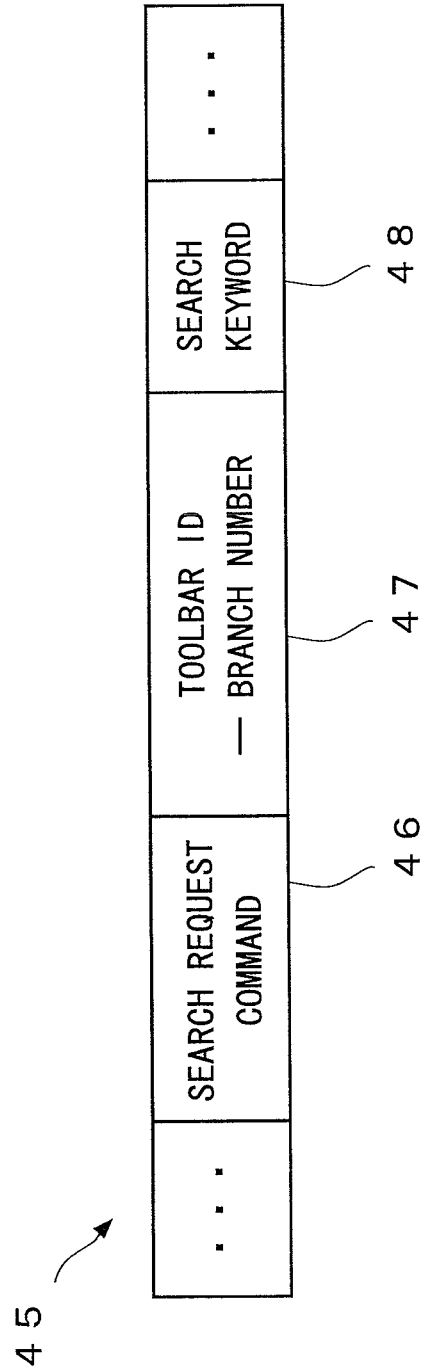
FIG. 12 is a schematic diagram showing a modification of the data format of FIG. 5.

FIG. 12 is a schematic diagram showing a modification of the data format of FIG. 5.

As shown in FIG. 12, in accordance with the data format configuration of the data 45 of the query, a toolbar ID 47 with a branch number is used, instead of the toolbar ID 42 and the member ID 43.

The branch number of the toolbar ID 47 with the branch number is an issue number when the toolbar 30 is issued. Specifically, a user who desires to participate in the A-group has access to a web page and the like of the A-group and downloads an installation file of the toolbar 30 from the database of the toolbar server 11, the server of the A-group, or the like. At this time, the toolbar server 11 or the like that downloads the toolbar 30 adds the issue number as the branch number to the tail of the toolbar ID and issues the toolbar 30. The issue number may be a serial number of the issue order or an issue date, time, and the like.

In the case of the toolbar ID 47 with the branch number, the user may not perform the member registration. When the installer of the toolbar 30 is downloaded or installed, the user becomes the member of the A-group.

In the toolbar information database 16, toolbar identification information that is associated with each of the groups and is allocated to each of the groups or toolbar identification information with an issue number is stored.

Next, an operation of the modification of this embodiment will be described.

The toolbar identification information with the issue number is information that is obtained by including member identification information as the issue number in the toolbar identification information. By receiving the search request and the toolbar identification information with the issue number from the terminal, the toolbar identification information (toolbar ID) and the member identification information (member ID) and the search request can be received from the terminal. For this reason, the modification is different from this embodiment in that the issue number and the toolbar identification information are separated from the toolbar identification information with the issue number, when the information is extracted in step S7, and the issue number (branch number) is used, instead of the member identification information, at the time of referring to the database in step S9 or evaluating the points in step S10.

First, the member terminal 21 transmits the data 45 of the query having the search request command 46 or the search keyword 48 and the toolbar ID 47 with the branch number to the management server 13, when the search is performed using the toolbar 30, in step that corresponds to step S5. The control unit 13*a* receives the query that has the data format of the data 45, in step corresponding to step S6. As such, the control unit 13*a* functions as a receiving means that receives the toolbar identification information with the allocated issue number, when the toolbar 30 is issued to the member with respect to the search request including the search keyword input to the entry field for search in the toolbar 30 displayed on the screen of the terminal 21 and the toolbar identification information associated with the group to which the member belongs and allocated for each of the groups.

Next, the control unit 13*a* extracts the toolbar ID 47 with the branch number, in step corresponding to step S20 of the information extraction subroutine. The control unit 13*a* separates the toolbar ID and the branch number from the toolbar ID 47 with the branch number, in step corresponding to step S21. Specifically, the control unit 13*a* extracts the toolbar ID from the first half of the toolbar ID 47 with the branch number and extracts the branch number from the second half, on the basis of the format of the toolbar ID 47 with the branch number.

The processing after the branch number is separated is executed while the branch number is regarded as the member ID. For example, in step corresponding to step S26, the control unit 13*a* reads the total number and the number of search of the members corresponding to the branch number from the database 13*b*, on the basis of the branch number of the toolbar ID 47 with the branch number. If the control unit 13*a* narrows the members belonging to the A-group on the basis of the member ID, and identifies the member requesting for search on the basis of the branch number, the control unit 13*a* can have access to the database 13*b* fast.

As such, in accordance with the modification of this embodiment, since the member corresponding to the user is managed by the branch number, the member can easily participate in the group as the activity of the group, even when the member registration is not performed.

In particular, in the case where the member registration is not performed, the processing of the sequence of the member registration when the toolbar 30 is provided or the processing of the member registration such as the issuing of the member ID is not executed, and the load of the management server is reduced. Since only the simple branch number such as the serial number is managed, the complicated member ID does not need to be referred to and a system can be simplified. If each of members is strictly identified when the points are provided to the member having some points, the number is restricted, different from when the toolbar 30 is provided. Therefore, the load of the management server 13 can be reduced.

By issuing the toolbar 30 including the toolbar ID 47 with the branch number, the member who uses the toolbar 30 can be automatically counted for each of the groups and data of the group unit is obtained. Therefore, information processing for each of the groups can be easily executed.

Second Embodiment

Next, an information processing sever system in accordance with the second embodiment of the invention will be described.

The configuration of the information processing server system is the same as that of the information processing sever system in accordance with the first embodiment, except for a partial function of the toolbar and data and the like of the result screen displayed on the display unit 21*a* of the member terminal 21. The same components as those of the first embodiment are denoted by the same reference numerals and the operation is described. The other embodiment and modification are the same.

Figure 13:
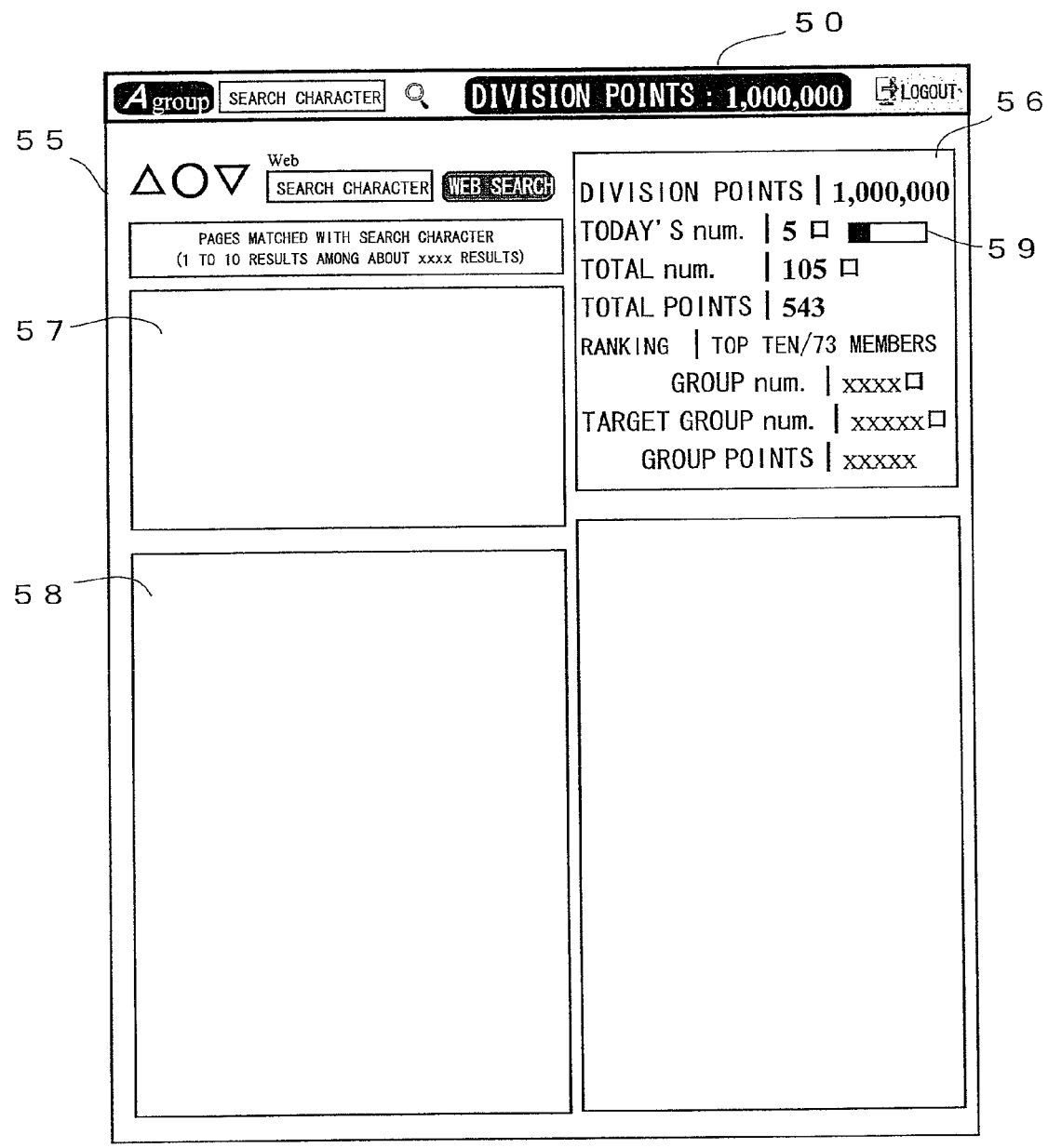
FIG. 13 is a schematic diagram showing a search result that is displayed on the member terminal of FIG. 1, in a second embodiment of the invention.

FIG. 13 is a schematic diagram showing a search result that is displayed on the member terminal 21, in the second embodiment of the invention.

As shown in FIG. 13, the browser has a toolbar portion 50 that performs a search request for search object on a network, on the basis of a search keyword input to a search box, and a search result portion 55 that displays a search result and the like.

In the toolbar portion 50, the counting result such as the search number or the group points is not displayed, different from the first embodiment.

The search result portion 55 has a counting result display frame 56 that displays the counting result such as the search number or the group points, an advertiser advertisement frame 57 that puts an advertisement of the advertiser 5 or the like, and a search result display frame 58 that displays a list of search results.

In the search result display frame 56, division points, a bar gauge 59 showing the today's number, and the target group number as the number of search of a threshold value, in which the division points increase, are displayed.

Next, an operation of the information processing server system in accordance with the second embodiment of the invention will be described on the basis of the drawings. The operation in the information processing system in accordance with the second embodiment is the same as the operation in the information processing system in accordance with the first embodiment, except for an operation of fusing data.

Figure 14:
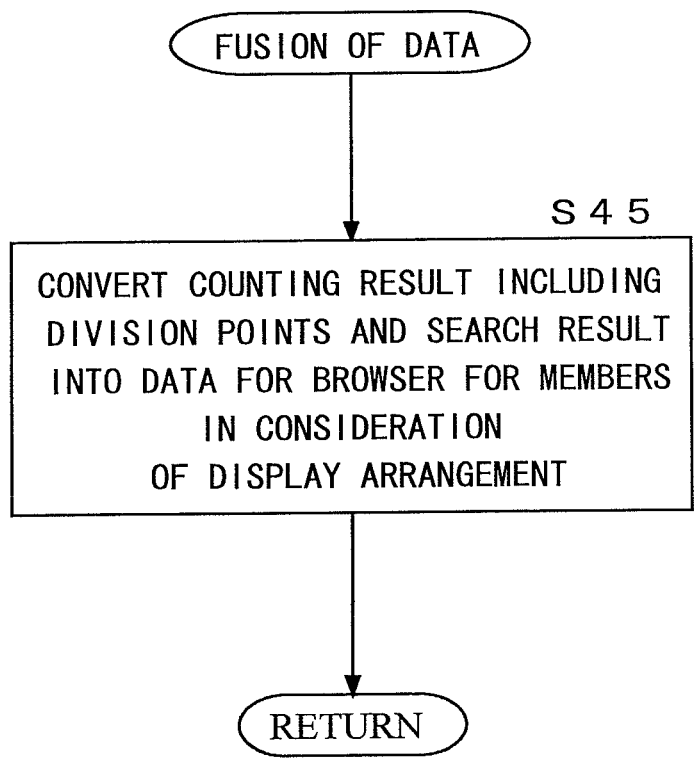
FIG. 14 is a flowchart showing a subroutine of an example of an operation of fusing data in the second embodiment of the invention.

FIG. 14 is a subroutine showing an example of an operation of fusing data in the second embodiment of the invention.

After the newest member number or member points are evaluated in step S10 and the search result is received in step S13, the control unit 13*a* fuses the counting result and the search result as in step S14 of the first embodiment. That is, as shown in FIG. 14, the control unit 13*a* converts the counting result including the division points and the search result into data for the browser to be used by the member in consideration of the display arrangement (step S45). Specifically, the control unit 13*a* fuses the counting result and the search result while adding tags for the HTML, such that the counting result can be displayed on the counting result display frame 56 and the search result can be displayed on the search result display frame 58. In addition, advertisement data of the advertiser 5 is added. The fused data is transmitted to the member terminal 21 in step S15. As such, the control unit 13*a* functions as an example of a data generating unit that generates data having the format to display the search result with respect to the search request and information of the member total points.

As such, in accordance with this embodiment, the management server 13 generates the data having the format to display the search result with respect to the search request and the counting result, the search result and the counting result such as the points are easily provided to the member on the result screen of the web browser, and the motivation that causes the member to use the search can be raised.

In the first and second embodiments, when the toolbar 30 is installed in the web browser, the toolbar ID may be stored in cookies formed in a hard disk driver of the member terminal 21. The toolbar 30 does not necessarily have the toolbar ID. For example, the toolbar ID may be stored in the codes of the program of the toolbar 30 or the installation program, and the toolbar ID, the member ID, or the like may be written in the cookies at the time of installation. In this case, when the search button 32 is pressed, the control unit of the member terminal 21 reads the toolbar ID of the cookies, generates the search query with the search keyword, and transmits the data to the management server 13.

The toolbar ID may be written in the cookies at the time of the first search and the toolbar ID may be read from the cookies at the time of the second and following searches.

The number of search or the points is not marked and may be graphically displayed as the bar gauge. In this case, the member can easily know the number of search, the degree of contribution, or the like.

The data format of the search request from the member terminal 21 is not limited to the data format shown in FIG. 5 and the management server 13 may have the data format to extract the toolbar ID or the member ID. For example, the toolbar ID or the member ID is fused with the search query including the search request command the search keyword, and data where the header or the like indicating that the toolbar ID or the member ID is included is added may be configured.

The search result may be displayed on both the toolbar 30 or the toolbar portion 50 and the search result portion 55.

The member total points may be updated in accordance with the number of members of the group. If the number of members who use the toolbar 30 increases, the number of members who view the advertisement of the advertiser 5 increases and advertisement effectiveness becomes high. Therefore, the advertiser 5 further invests the advertisement charges. Due to the increase in the number of members, the points that are distributed to the members among the division points decrease. However, since the division points increase in accordance with the number of members of the group, the motivation that causes each of members to use the toolbar is not lowered.

The management side or the group side may increase the member total points to urge the participation of the members. The management server 13 decreases the commission of the management side or the ratio of the group points to increase the ratio of the member total points or the management side or the group side directly invests capital to increase the member total points.

If bonus points and the like are provided when the points are accumulated to some degree, the member uses the same toolbar 30 to accumulate the points.

However, the invention is not limited to the above-described embodiments. The above-described embodiments are exemplary. Various different embodiments where substantially the same configuration as the technological thought described in the claims of the invention are used and the same function and effect are archived are included in the technical range of the invention.

DESCRIPTION OF REFERENCE NUMERALS

10: information processing server system
11: toolbar server
12: search server
13: management server
13a: control unit
13b: database
20, 25: group terminal
21, 26: member terminal (terminal)
30: toolbar
31: search box (entry field for search)
33: division point field (member total points)
34: today's number field (number of member search)
35: total number field (number of member search)
36: total point field (member points)
37: group number field (number of group search)
38: group point field (group points)
42: toolbar ID (toolbar identification information)
43: member ID (member identification information)
44: search keyword
50: toolbar portion
55: search result portion
56: total result display frame
58: search result display frame

The invention claimed is:

1. An information apparatus for receiving a search request including a search keyword input to an entry field for search in a toolbar displayed on a screen of a terminal from the terminal and executing information processing, the information processing apparatus comprising:
a group information storage unit for storing information received from each of groups and associated with each of the groups;
a toolbar information storage unit for storing toolbar identification information associated with and allocated to each of the groups;
a member information storage unit for storing member identification information storage unit for storing member identification information identifying members belonging to each of the groups and associated with each of the groups;
a receiving unit for receiving the toolbar identification information, the member identification information, and the search request from the terminal;
an evaluating unit for identifying the members on the basis of the member identification information with reference to the member information storage unit, and counting a member search request of each of members by accumulating a history of the search request for each of members;
a counting result storage unit for storing a counting result of the evaluating unit;
a total point calculating unit for calculating member total points distributable to the members; and
a transmitting unit for transmitting information of the member total points to the terminal, wherein
the evaluating unit refers to the toolbar information storage unit, and counts a group search request as each of the groups by counting the member search request on the basis of the toolbar identification information, and
the total point calculating unit updates the member total points on the basis of the counted group search request.

2. The information processing apparatus according to claim 1, wherein
the evaluating unit counts member points for each of members distributed to each of members from the member total points, on the basis of the member search request.

3. The information processing apparatus according to claim 1, wherein
the total point calculating unit sets initial member total points, on the basis of the group search request counted during a past constant period.

4. The information processing apparatus according to claim 1, wherein
the evaluating unit counts the number of group search for each of the groups, on the basis of the group search request.

5. The information processing apparatus according to claim 4, wherein
The total point calculating unit updates the member total points, in the case where the number of group search exceeds the number of search of a threshold value.

6. The information processing apparatus according to claim 5, wherein
the number of search of the threshold value is calculated on the basis of the number of group search counted during a past constant period.

7. The information processing apparatus according to claim 1, further including:
a data generating unit that generates data having a format to display information of the member total points on the toolbar.

8. The information processing apparatus according to claim 7, wherein
the data generating unit generates data having the format to display a search result with respect to the search request and information of the member total points.

9. The information processing apparatus according to claim 1, further including
a toolbar providing unit for allocating toolbar identification information to each of the groups and issuing the toolbar.

10. An information processing method that an information processing apparatus receives a search request including a search keyword input to an entry field for search in a toolbar displayed on a screen of a terminal from the terminal and executes information processing, the information processing method comprising:
storing information received from each of groups and associated with each of the groups;
storing, in a toolbar information storage unit, toolbar identification information associated with and allocated to each of the groups;
storing member identification information to identify members belonging to each of the groups and associated with each of the groups;
receiving the toolbar identification information, the member identification information, and the search request from the terminal;
identifying the members on the basis of the member identification information, and counting a member search request of each of members by accumulating a history of the search request for each of members;
storing a counting result of the counting operation;
calculating member total points distributable to the members; and
transmitting information of the member total points to the terminal, wherein
a group search request as each of the groups is counted by referring to the toolbar information storage unit and counting the member search request on the basis of the toolbar identification information, and
the member total points are updated on the basis of the counted group search request.

11. A non-transitory computer-readable recording medium that records an information processing program for causing a computer to receive a search request including a search keyword input to an entry field for search in a toolbar displayed on a screen of a terminal from the terminal and executed information processing, the information processing program causing the computer to function as:
a group information storage unit for storing information received from each of groups and associated with each of the groups;
a toolbar information storage unit for storing toolbar identification information associated with and allocated to each of the groups;
a member information storage unit for storing member identification information identifying members belonging to each of the groups and associated with each of the groups;
a receiving unit for receiving the toolbar identification information, the member identification information, and the request from the terminal;
an evaluating unit for identifying the members on the basis of the member identification information with reference to the member information storage unit, and counting a member search request of each of members by accumulating a history of the search request for each of members;
a counting result storage unit for storing a counting result of the evaluating unit;
a total point calculating unit for calculating member total points distributable to the members; and
a transmitting unit for transmitting information of the member total points to the terminal, wherein
the evaluating unit refers to the toolbar information storage unit, and counts a group search request as each of the groups by counting the member search request on the basis of the toolbar identification information, and
the total point calculating unit updates the member total points on the basis of the counted group search request.

12. The information apparatus of claim 1, wherein the member inputs the search request at the terminal.

13. The information processing method of claim 10, wherein the member inputs the search request at the terminal.

14. The computer-readable recording medium of claim 11, wherein the member inputs the search request at the terminal.

15. An information processing apparatus for receiving a search request including a search keyword input to an entry field for search in a toolbar displayed on a screen of a terminal from the terminal and executing information processing, the information processing apparatus comprising:
a memory operable to store program code instructions; and
a processor configured to read said program code instructions and as instructed by said program code instructions:
store information received from each of groups and associated with each of the groups;
store, in a toolbar information storage unit, toolbar identification information associated with and allocated to each of the groups;
store member identification information to identify members belonging to each of the groups and associated with each of the groups;
receive the toolbar identification information, the member identification information, and the search request from the terminal;
identify the members on the basis of the member identification information, count a member search request of each of members by accumulating a history of the search request for each of members, and store a result of the count;
calculate member total points distributable to the members; and transmit information of the member total points to the terminal, wherein a group search request as each of the groups is counted by referring to the toolbar information storage unit and counting the member search request on the basis of the toolbar identification information, and the member total points are updated on the basis of the counted group search request.

16. The information processing apparatus according to claim 1, wherein each of the groups is an aggregate of people.

* * * * *